March 24, 1959  H. GUNKEL  2,878,910

CLUTCH-BRAKE DEVICE

Filed April 26, 1955

INVENTOR
Heinrich Gunkel
By Ernest J. Montague
Attorney

United States Patent Office 2,878,910
Patented Mar. 24, 1959

2,878,910

CLUTCH-BRAKE DEVICE

Heinrich Gunkel, Dusseldorf, Germany, assignor to Hans Putzer, Dusseldorf, Germany Application April 26, 1955, Serial No. 503,939

Claims priority, application Germany May 11, 1954

4 Claims. (Cl. 192—12)

The present invention relates to a free chain path on chain pulls in a thread operated automatic load sustained brake, in which the drive is achieved in such manner that a brake element is rotated in both directions either by a hand-chain wheel or by a ratchet and pawl mechanism in a threaded portion of the driving shaft whereby the brake is opened or closed.

Such apparatus is usually provided with a brake device in the nature of a freewheel enabling the said shaft to be rotated in the direction in which the load is raised or dragged (this direction of rotation being called hereinafter, for the sake of convenience, the "lifting direction") but preventing rotation of the shaft in the opposite direction (the "lowering direction").

It is, of course, necessary to provide for rotation of the said shaft in the lowering direction to enable the said flexible element to be unwound from said drum or other member, e.g. to enable a load carried by said flexible element to be lowered.

The said brake device often comprises a brake disc provided with ratchet teeth adapted to engage with a pawl or dog in such manner that the brake disc may only rotate in the lifting direction; said brake disc is freely mounted on the shaft and trapped between friction surfaces carried respectively by a plate fixed to the shaft and a driving member in the form of a nut running on a screw thread on the shaft. The arrangement is such that rotation of the said driving member in the lifting direction causes the driving member to advance along the shaft towards said brake disc so that the latter is frictionally locked to the shaft.

With such an arrangement, rotation of the shaft in the lowering direction may be effected by rotation of the driving member in that direction, such rotation causing the driving member first to move along the shaft away from the brake disc a sufficient distance to free the brake disc from the shaft; thereafter the shaft may rotate in the lowering direction with the driving member.

It will be apparent that with such an arrangement any tendency for the shaft to rotate in the lowering direction faster than the rotation of the driving member in the same direction will result in the driving member advancing towards the brake disc and so causing braking of the shaft; whilst this is a desirable safety feature, it prevents, when there is no load on the flexible element, the latter being unwound rapidly from the drum or other member by simple pulling on the flexible element.

It is, therefore, one object of the present invention to provide a free chain path on chain pulls in a thread operated automatic load sustained brake including a brake device as above described but in which the brake device may be rendered inoperative so that the flexible element may be unwound from the said drum or other member by a simple pulling on the flexible element.

It is another object of the present invention to provide a free chain path on chain pulls in a thread operated automatic load sustained brake which comprises a shaft having a brake disc freely rotatable thereon, a brake plate fixed to said shaft adjacent to one side of said brake disc, a driving member threaded on said shaft and adapted, when rotated in one direction, to advance along the shaft into contact with said brake disc to trap the latter between the driving member and said brake plate thereby frictionally to lock said brake disc to the shaft, stop means limiting rotation of said driving member relatively to said shaft in the opposite direction, and means for releasably retaining the driving member against rotation relatively to the shaft into engagement with said brake disc.

It is a further object of the present invention to provide a free chain path on chain pulls in a thread operated automatic load sustained brake, which includes a driving member threaded on a shaft, the latter having a brake disc freely rotatable thereon, and stop means limiting rotation of said driving member relatively to said shaft in the opposite direction, which stop means comprise an abutment carried by the driving member and adapted to co-operate with a further abutment carried by the shaft, and retaining means comprise a dog extending radially of the said shaft and urged resiliently outwardly thereof into contact with an internal surface of the driving member and adapted to engage in a recess in such surface when the driving member has been rotated relatively to the shaft out of engagement with the said brake disc; and the said dog may constitute the said further abutment or may be spaced therefrom or it may be located in a radial bore in said further abutment.

With these and other objects in view which will become apparent in the following detailed description, the present invention will be clearly understood in connection with the accompanying drawings, in which.

Figure 1:
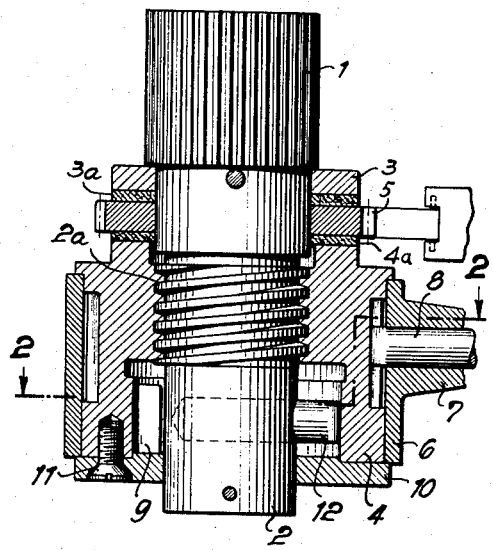
Figure 1 is a fragmentary part-sectional plan view of hoisting apparatus in accordance with one embodiment of this invention.
Figure 2:
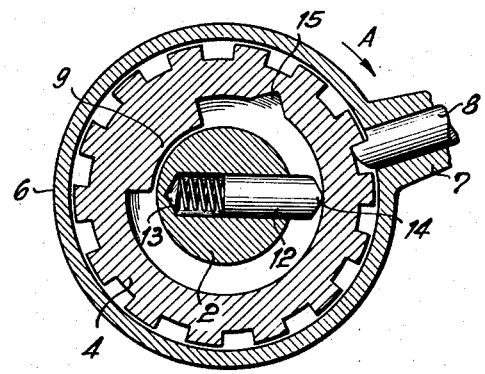
Fig. 2 is a fragmentary part-sectional view taken on approximately the line 2—2 of Fig. 1.

Referring now to Figs. 1 and 2 of the drawing, the apparatus there illustrated comprises a shaft 2 which is journalled in suitable bearings (not shown) and carries at one end a pinion 1 adapted to mesh with gears for driving a drum or pulley (not shown). The arrangement is such that rotation of the shaft 2 in a clockwise direction, as viewed from the bottom of Fig. 1, serves to wind a flexible element upon the said drum or pulley and such clockwise rotation of the shaft 2 will be referred to as "rotation in the lifting direction"; rotation in the opposite direction will be referred to as "rotation in the lowering direction."

The shaft 2 has pinned thereto a brake plate 3 whilst a screw-threaded portion 2a of the shaft 2 carries a driving member 4 in the form of a cylindrical nut.

Between the brake plate 3 and the driving member 4 is located a brake disc 5 which is freely rotatable about the shaft 2; suitable friction linings 3a and 4a are carried respectively by the opposed faces of the brake plate 3 and driving member 4 so that when the driving member 4 is rotated relatively to the shaft 2 in the lifting direction, the driving member 4 will advance along the shaft towards the brake plate 3 and thus trap the brake disc 5 between the friction linings 3a and 4a, thereby frictionally to lock the brake plate 5 to the shaft 2. The brake plate 5 is provided with peripheral ratchet teeth which engage with a suitable pawl by means of which rotation of the brake disc 5 in the lowering direction is prevented.

The driving member 4 is surrounded by a collar 6 which is furnished with a radial arm 7 carrying a driving pawl 8 adapted to engage teeth in the periphery of the driving member 4 so that oscillation of the arm 7 about the axis of the shaft 2 will cause intermittent rotation of the driving member 4, the direction of this rotation being governed by the position of the pawl 8; with the pawl 8 in the position shown in Figs. 1 and 2, oscillation of the arm 7 will cause rotation of the driving member 4 in the lifting direction, whilst rotation of the pawl 8 through 180° about its axis will cause, on oscillation of the arm 7, rotation of the driving member 4 in the lowering direction.

The end of the driving member 4 remote from the brake disc 5 is provided with a counter-bore of greater diameter than the shaft 2 and in the annular space defined by this counter-bore and the shaft 2 there is located an abutment 9 which is conveniently formed by a tongue pressed out of a sheet metal cover 10 secured to the driving member 4, for example by means of screws 11.

The shaft 2 is provided with a radial bore within which is slidable a dog 12, this dog being urged outwardly of the shaft 2 by means of a spring 13. The tip 14 of the dog 12 runs on the internal surface of the driving member 4 and this surface is provided with a notch 15 at a position such that when the driving member 4 has been rotated relatively to the shaft 2 in the lowering direction (indicated by the arrow A in Fig. 2) sufficiently to release the brake disc 5 from frictional engagement with the friction linings 3a and 4a, the tip 14 of the dog 12 will be received in the notch 15, thereby releasably to retain the driving member 4 against rotation relatively to the shaft 2. Should the tip 14 of the dog 12 over-run the notch 15, then it will come into contact with the abutment 9 and so positively prevent the driving member 4 unscrewing more than a predetermined distance along the threaded portion 2a of the shaft.

It will now be apparent that when it is desired to lower a load carried by the flexible element of the hoisting apparatus, this may be effected in the customary manner by oscillation of the arm 7 with the pawl 8 in the appropriate position; the first part of each movement of the driving member 4 in the lowering direction will cause rotation of the driving member 4 relatively to the shaft 2 so as to move away from the brake disc 5 and thereby release the shaft 2 for rotation in the lowering direction, the remainder of each such movement of the driving member being accompanied by a corresponding part-rotation of the shaft 2. At the end of each movement of the driving member 4 in the lowering direction, the shaft 2 will tend to over-run and consequently the driving member 4 will advance along the shaft towards the brake disc 5 and thus cause the shaft 2 to be braked.

When it is desired to unwind the flexible element rapidly from the drum or pulley and the element is under no load, rotation of the driving member 4 in the lowering direction will cause the tip 14 of the dog 12 to enter the notch 15 so that rotation of the shaft 2 in the lowering direction, e.g., by pulling on the flexible element, will cause the driving member 4 to be carried along with the shaft 2 and not tend to advance towards the brake disc 5. During such rotation in the lowering direction, the pawl 8 can be withdrawn from engagement with the teeth on the periphery of the driving member 4 or it may merely be left in the lowering position.

It will be seen that in the embodiments of Figs. 1 and 2, the dog 12 serves as an abutment on the shaft 2 adapted to engage the abutment 9 should the shaft tend to over-run the driving member 4 in the lowering direction.

Figure 3:
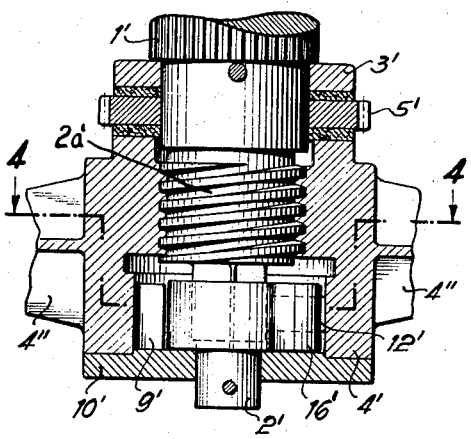
Fig. 3 is a fragmentary part-sectional plan view of hoisting apparatus in accordance with a second embodiment of this invention.
Figure 4:
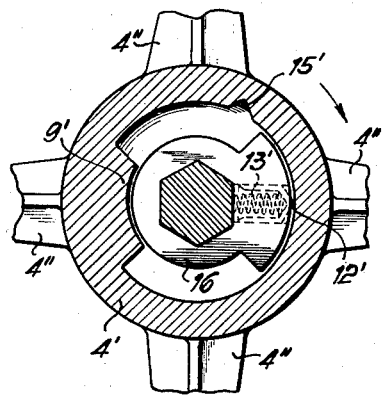
Fig. 4 is a fragmentary part-sectional view taken approximately on the line 4—4 in Fig. 3.

In the embodiment shown in Figs. 3 and 4, parts of the apparatus corresponding to similar parts of the embodiments of Figs. 1 and 2 have been given similar reference numerals, the reference numerals of such parts in Figs. 3 and 4 being primed.

Thus the apparatus shown in Figs. 3 and 4 comprises a shaft 2' rigidly carrying a brake plate 3', while a brake disc 5', freely rotatable about the shaft 2', is located between the brake plate 3' and a driving member 4' which is mounted on a screw-threaded portion 2a' of the shaft 2'.

In this embodiment, the driving member 4' is adapted to be rotated by means of a handwheel and in fact the driving member 4' constitutes the hub of a spoked handwheel, the spokes of which are indicated at 4".

The end of the driving member 4' remote from the brake disc 5' carries a cover 10' out of which is pressed a tongue 9' constituting an abutment in the annular space between the shaft 2' and the internal surface of the driving member 4'.

The shaft 2' carries an abutment 16' having the shape clearly shown in Fig. 4, this abutment 16' fitting on a portion of the shaft 2' having a hexagon cross-section so that it cannot rotate relatively to the shaft.

The abutment 16' is furnished with a radial bore in which is located a dog 12' which is urged outwardly by means of a spring 13' and is adapted to be received in a notch 15' in the internal surface of the driving member 4' when the latter has been rotated relatively to the shaft 2' in the lowering direction sufficiently for the brake disc 5' to be freed from frictional engagement with respectively the brake plate 3' and the driving member 4'.

Apart from these detail differences, the apparatus illustrated in Figs. 3 and 4 operates in the same manner as the apparatus illustrated in Figs. 1 and 2.

It will be apparent that when either form of apparatus described is incorporated in hoisting apparatus in which the flexible element comprises a chain or cable passing over a pulley, release of the brake can be effected by pulling on the load-free portion of the flexible element so as to rotate the shaft 2 or 2' in the lifting direction, provided that the shaft is accelerated sufficiently rapidly for the inertia of the driving member to cause relative rotation between the latter and the shaft in the lowering direction. Thus if only a small load is carried by the flexible element, a jerk on the load-free portion of the latter will serve to release the brake of the apparatus and permit rotation of the shaft 2 or 2' in the lowering direction.

While I have disclosed two embodiments of the present invention, it is to be understood that these embodiments are given by example only and not in a limiting sense, the scope of the present invention being determined by the objects and the claims.

I claim:

1. A free chain path on chain pulls with thread operated automatic load sustained brakes comprising a shaft having a brake disc freely rotatable thereon and having a thread along a part of its length, a brake plate fixed to said shaft adjacent to one side of said brake disc, a driving member surrounding said shaft and engaging said thread of said shaft and adapted, when rotated in one direction, to advance along said shaft into contact with said brake disc to trap the latter between said driving member and said brake plate, thereby frictionally to lock said brake disc to said shaft, stop means disposed within and secured to said driving member and abutment means secured to said shaft, said stop means being within the path of rotary movement of said abutment means and, thereby, limiting rotation of shaft in the opposite direction, one end of said driving member having a counter-bore of a diameter larger than that of said shaft and defining an annular space between said driving member and said shaft, and a spring biased dog disposed radially in and projecting outwardly of said shaft and a notch disposed on the internal surface of said counter-bore of said driving member, receiving said dog in a predetermined position of said driving member.

2. The apparatus, as set forth in claim 1, said stop means comprising a radially inwardly projecting member, and said dog constituting said abutment means.

3. The apparatus, as set forth in claim 1, said stop means comprising a radially inwardly projecting member, and said abutment means engaging said stop means in a predetermined position of said driving member.

4. The apparatus, as set forth in claim 1, which includes a cover plate carried by one end of said driving member remote from said brake disc and embracing said shaft, and said stop means comprises a tongue projecting from said cover plate into said annular space.

References Cited in the file of this patent
UNITED STATES PATENTS

| | | |
|---|---|---|
| 844,808 | Kendall | Feb. 19, 1907 |
| 2,390,891 | Martin | Dec. 11, 1945 |